US012777234B2

(12) United States Patent
Deal et al.

(10) Patent No.: US 12,777,234 B2
(45) Date of Patent: Oct. 27, 2026

(54) SYSTEMS AND METHODS FOR TRIGGERING ACTIONS ON A CLIENT MEDIA PLAYER BASED ON LIVE EVENTS DURING A LIVE MEDIA BROADCAST

(71) Applicant: Netflix, Inc., Los Gatos, CA (US)

(72) Inventors: Allison Nicole Deal, Santa Monica, CA (US); Flavio Ribeiro Nogueira Barbosa, Brooklyn, NY (US); Xiaomei Liu, Cupertino, CA (US); Katheryn Shi, Seattle, WA (US); Wei Wei, Plano, TX (US); Christopher Newton, North Richland Hills, TX (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/351,434

(22) Filed: Jul. 12, 2023

(65) Prior Publication Data

US 2025/0024114 A1 Jan. 16, 2025

(51) Int. Cl.

| | |
|---|---|
| ***H04N 21/6543*** | (2011.01) |
| ***H04N 21/2187*** | (2011.01) |
| ***H04N 21/239*** | (2011.01) |
| ***H04N 21/472*** | (2011.01) |

(52) U.S. Cl.

CPC ..... *H04N 21/6543* (2013.01); *H04N 21/2187* (2013.01); *H04N 21/47217* (2013.01)

(58) Field of Classification Search

CPC ........... H04N 21/6543; H04N 21/2187; H04N 21/47217

See application file for complete search history.

(56) References Cited

U.S. PATENT DOCUMENTS

| | | | | |
|---|---|---|---|---|
| 7,774,815 B1 * | 8/2010 | Allen | H04N 21/8133 | 725/51 |
| 11,871,050 B1 * | 1/2024 | Koceski | H04N 21/23424 | |
| 2004/0114052 A1 * | 6/2004 | Sin | H04N 21/4345 | 348/731 |
| 2005/0120373 A1 * | 6/2005 | Thomas | H04N 5/76 | 386/230 |
| 2013/0064524 A1 * | 3/2013 | Griffin | H04N 21/6587 | 386/262 |
| 2013/0298146 A1 * | 11/2013 | Conrad | H04N 21/6582 | 725/35 |

(Continued)

OTHER PUBLICATIONS

International Search Report and Written Opinion for International Application No. PCT/US2024/032874, mailed Aug. 9, 2024, 82 pages.

*Primary Examiner* — Rong Le

(74) *Attorney, Agent, or Firm* — Artegis Law Group, LLP

(57) ABSTRACT

The disclosed computer-implemented methods and systems trigger actions by a client media player in response to determining that a live event has occurred during a live media broadcast. For example, the disclosed methods and systems determine that a live event has occurred during a live media broadcast and can generate instructions for various actions that the client media player should take in response to the live event. In one or more implementations, the disclosed methods and systems communicate these tailored instructions via the same dedicated communication channel that carries media content requests and responses. Various other methods, systems, and computer-readable media are also disclosed.

20 Claims, 8 Drawing Sheets

(56) References Cited

U.S. PATENT DOCUMENTS

| | | | | |
|---|---|---|---|---|
| 2017/0150190 | A1 | 5/2017 | Tarbox | |
| 2017/0257651 | A1* | 9/2017 | Zhu | H04N 21/24 |
| 2017/0332120 | A1 | 11/2017 | Maynard | |
| 2022/0167063 | A1 | 5/2022 | Zheng | |
| 2024/0107118 | A1* | 3/2024 | Ellingford | G06F 3/0488 |

* cited by examiner

SYSTEMS AND METHODS FOR TRIGGERING ACTIONS ON A CLIENT MEDIA PLAYER BASED ON LIVE EVENTS DURING A LIVE MEDIA BROADCAST

BACKGROUND

Streaming media content, including TV shows and movies, is a common form of entertainment. For example, streaming platforms can transmit media data to client-side media players. The media players can playback the media data while providing additional functionality such as a seek bar. Using the seek bar, a viewer can scrub backwards and forwards through the media playback to watch specific portions of the movie or TV show.

While most media played by a media player is prerecorded (e.g., a TV show or movie that has already been produced), some streaming platforms can enable streaming of live media. To illustrate, some streaming platforms can stream media data associated with a live event (e.g., a sports game, a comedy special, a music concert) in real-time. In response to receiving this real-time media data, the client-side media players can play real-time media data while making the same media data available for backward scrubbing.

Despite this, streaming live media can be problematic in various scenarios. For example, some live-streamed events may include pre-show content and/or post-show content. Despite this, content creators may not want to make this additional content to be available for backward and forward scrubbing via a client-side media player as part of the live media broadcast. There may also be other content that occurs during the live broadcast that content creators may not want to include as part of the "seekable" media data on the client-side. For example, technical difficulties may occur during the live broadcast. Content creators may not want the portion of the live broadcast including technical difficulties to be seekable (e.g., by scrubbing the seek bar backwards on the media player) while later portions of the live broadcast are being displayed. Furthermore, a live broadcast may include paid content that should be viewed in its entirety without being skipped or scrubbed over. Conventional streaming platforms offer no solutions for these types of issues that are unique to streaming live media broadcasts.

SUMMARY

As will be described in greater detail below, the present disclosure describes implementations that communicate live events during live media broadcasts to client media players using existing communication channels to cause the client media players to perform actions based on the live events. For example, some implementations include receiving, at a content delivery server during a live media broadcast, a media content request from a client media player. Additionally, some implementations include, in response to determining that a live event has occurred during the live media broadcast, generating one or more client media player instructions tailored to the live event, and generating a media content response including the requested media content and the one or more client media player instructions. Moreover, some implementations also include transmitting the media content response to the client media player to trigger the client media player to perform actions based on the one or more client media player instructions.

In some examples, the content delivery server receives media content requests every predetermined number of seconds during the live media broadcast. Moreover, in some examples, determining that the live event has occurred during the live media broadcast includes at least one of determining that the live media broadcast has begun following pre-show media content, determining that the live media broadcast has ended prior to post-show media content, determining that a broadcast error has occurred associated with the live media broadcast, determining that a media highlight has occurred during the live media broadcast, or determining that paid content has been inserted into the live media broadcast.

Additionally, in some examples, determining that the media highlight has occurred during the live media broadcast includes determining that a sports highlight has occurred during the live media broadcast, determining that a celebrity event has occurred during the live media broadcast, determining that an availability of an interactive feature has changed during the live media broadcast, determining that a camera view has changed during the live media broadcast, or determining that a scene change has occurred during the live media broadcast. In some examples, generating the one or more client media player instructions tailored to the live event includes generating client media player instructions to modify characteristics of a user interface presented by the client media player in association with the live media broadcast. In at least one example, the characteristics of the user interface include a seek bar, a control associated with playback of one or more streams of the live media broadcast, a title bar, or a subtitle area.

Additionally, in some examples, generating the one or more client media player instructions to modify one or more characteristics of a seek bar presented by the client media player in association with the live media broadcast includes generating client media player instructions to modify characteristics of the seek bar to make the pre-show media content unseekable, generating client media player instructions to modify characteristics of the seek bar to make the post-show media content unseekable, generating client media player instructions to modify characteristics of the seek bar to make a portion of the live media broadcast associated with the broadcast error unseekable, or generating client media player instructions to modify characteristics of the seek bar to indicate where the media highlight has occurred within a portion of the live media broadcast that has already been transmitted. Furthermore, in some examples, determining that the live event has occurred during the live media broadcast includes determining that the live media broadcast has concluded, and generating the client media player instructions tailored to the live event includes generating client media player instructions that cause the client media player to close and return a user of the client media player to a digital content system main menu.

Some examples described herein include a system with at least one physical processor and physical memory including computer-executable instructions that, when executed by the at least one physical processor, cause the at least one physical processor to perform various acts. In at least one example, the computer-executable instructions, when executed by the at least one physical processor, cause the at least one physical processor to perform acts including receiving, during a live media broadcast, a media content request from a client media player, in response to determining that a live event has occurred during the live media broadcast, generating client media player instructions tailored to the live event, and generating a media content response including the requested media content and the client media player instructions, and transmitting the media content response to the client media player to trigger the client media player to perform actions based on the client media player instructions.

In some examples, the above-described method is encoded as computer-readable instructions on a computer-readable medium. In one example, the computer-readable instructions, when executed by at least one processor of a computing device, cause the computing device to receive, during a live media broadcast, a media content request from a client media player, in response to determining that a live event has occurred during the live media broadcast, generate client media player instructions tailored to the live event, and generate a media content response including the requested media content and the client media player instructions, and transmit the media content response to the client media player to trigger the client media player to perform actions based on the client media player instructions.

In one or more examples, features from any of the embodiments described herein are used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
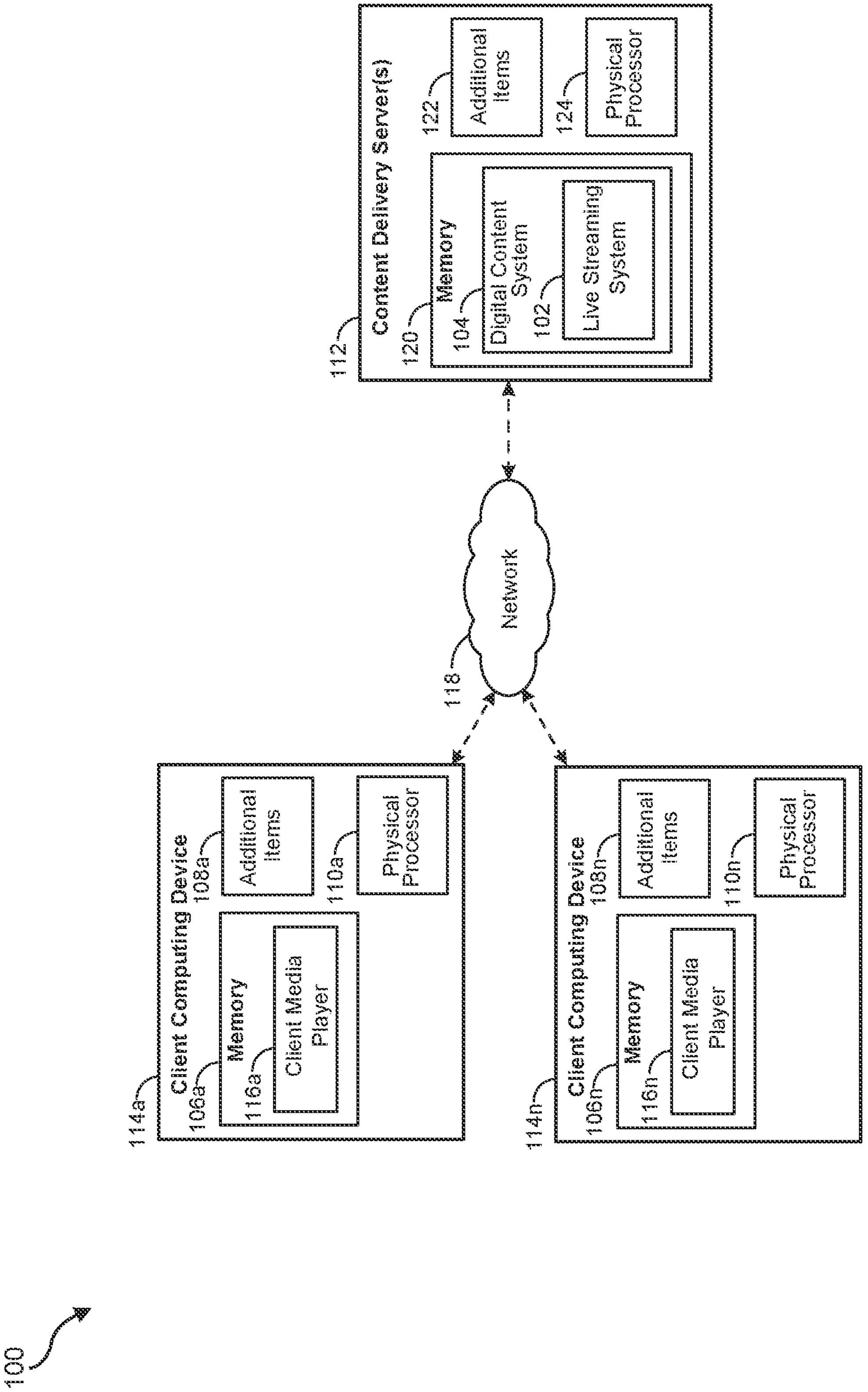
FIG. 1 is a block diagram of an exemplary environment for implementing a live streaming system in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As mentioned above, some digital media streaming platforms treat live media broadcasts simply as recordable events. To illustrate, a streaming platform may stream a live media broadcast to a client media player for playback. The client media player may play the live media broadcast while making previously received portions of the live media broadcast accessible via a seek bar (e.g., where the viewer can scrub backwards to view prior portions of the live media broadcast). As such, the client media player is akin to a digital video recorder that enables indiscriminate access to all previously received portions of the live media broadcast—at least for the duration of the live media broadcast. Thus, previous digital media streaming platforms may not be able to control how portions of live media broadcasts are accessed after those portions are transmitted to client media players. As further mentioned above, this may be problematic when the live media broadcast includes portions (e.g., a pre-show, a post-show, technical difficulties, show highlights) that a streaming platform may want to make "unseekable" (e.g., non-accessible from the media player seek bar) or—conversely—easily found via the media player seek bar.

To address these problems, the present disclosure describes a system that triggers different types of media player modifications depending on a detected live event during a live broadcast. In one example, the disclosed system triggers the media player to modify its user interface based on a detected live event. To illustrate, the system triggers the media player to modify its seek bar to either highlight previously received portions of a live broadcast or to make those previously received portions inaccessible for additional re-play. In other examples, the disclosed system triggers the media player to modify its user interface to include various controls that enable a viewer to switch the video and/or audio feeds amongst a number of feeds during the live event that are not available as part of a pre-show or post-show.

In addition to media player user interface modification, the disclosed system also triggers the media player to modify behaviors based on a live event detected during a live broadcast. To illustrate, the disclosed system triggers the media player to modify its pause/resume behavior based on a detected live event. In another example, the disclosed system triggers the media player to close and return the viewer to a main menu or previous screen based on detecting the end of the live broadcast. In many examples, the disclosed system triggers these media player modifications with customized instructions sent in tandem with live broadcast media data during the live broadcast. In some examples, the disclosed system triggers these media player modifications by providing up front instructions on how to handle detected live events prior to live broadcast and then communicating live events to the media player during the live broadcast as they occur.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
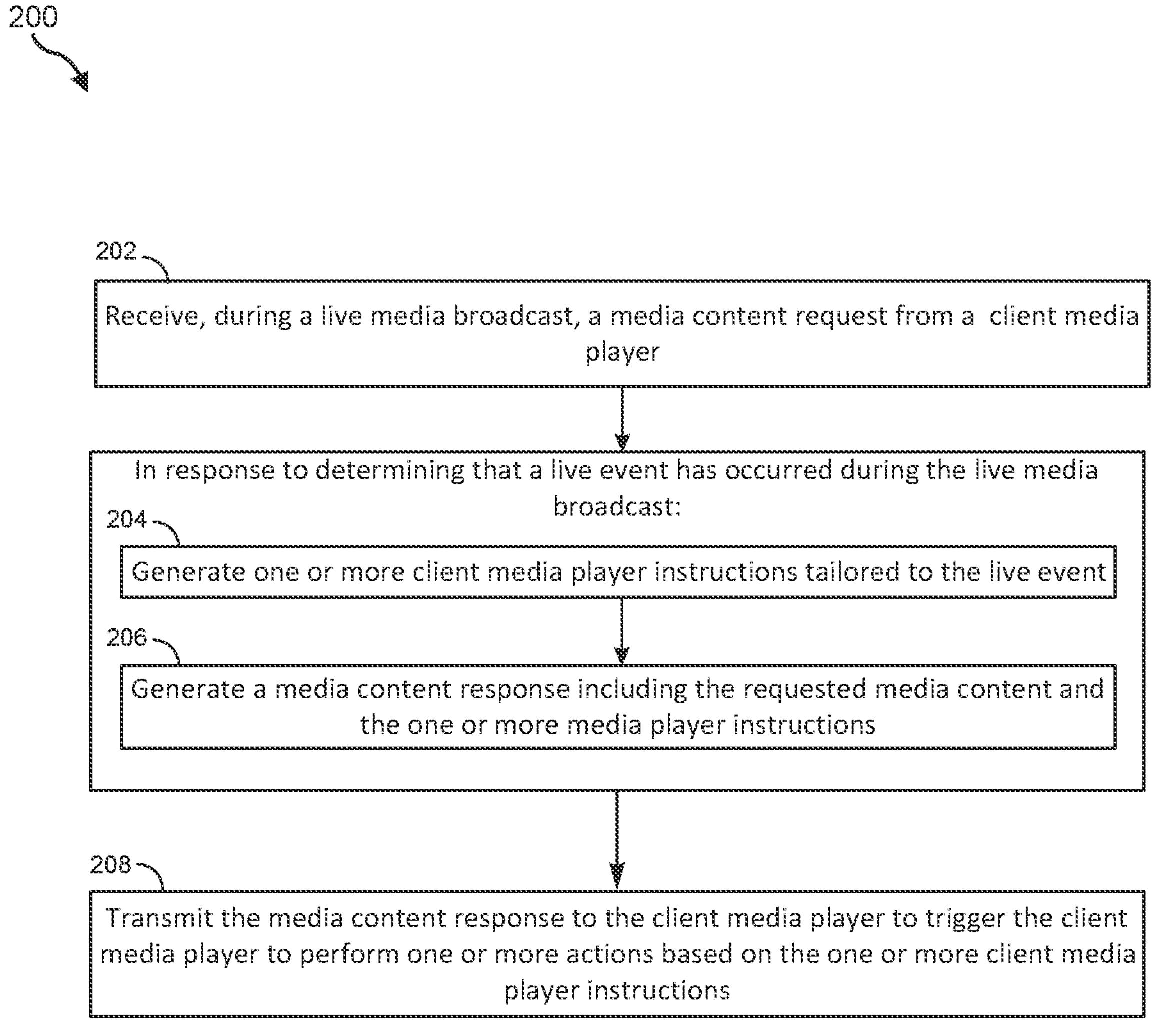
FIG. 2 is a flow diagram of an exemplary computer-implemented method for triggering client media players to perform various actions based on live events during live media broadcasts in accordance with one or more implementations.
Figure 3A:
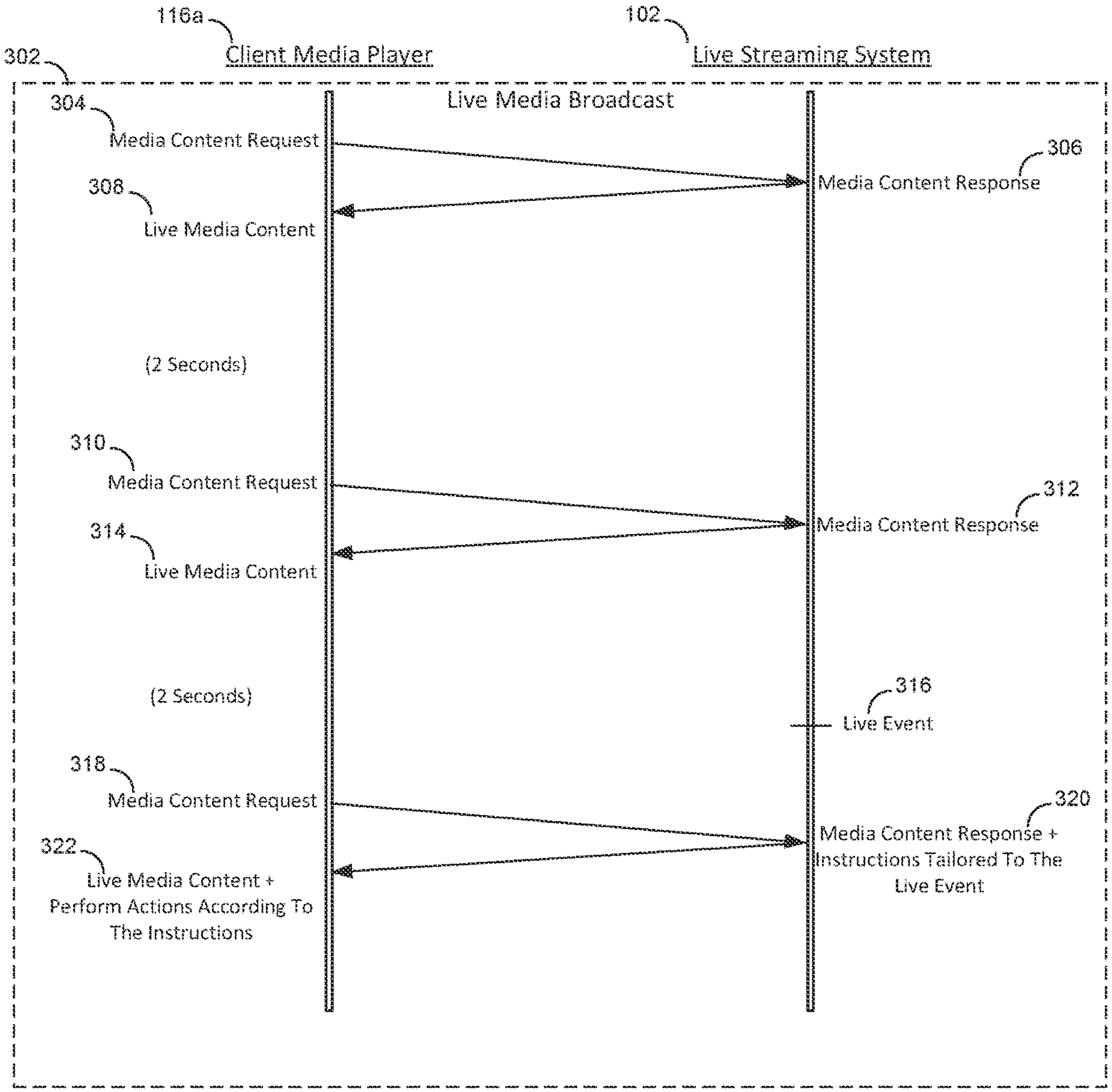
FIGS. 3A and 3B illustrate the live streaming system triggering client media player actions in accordance with one or more implementations.
Figure 3B:
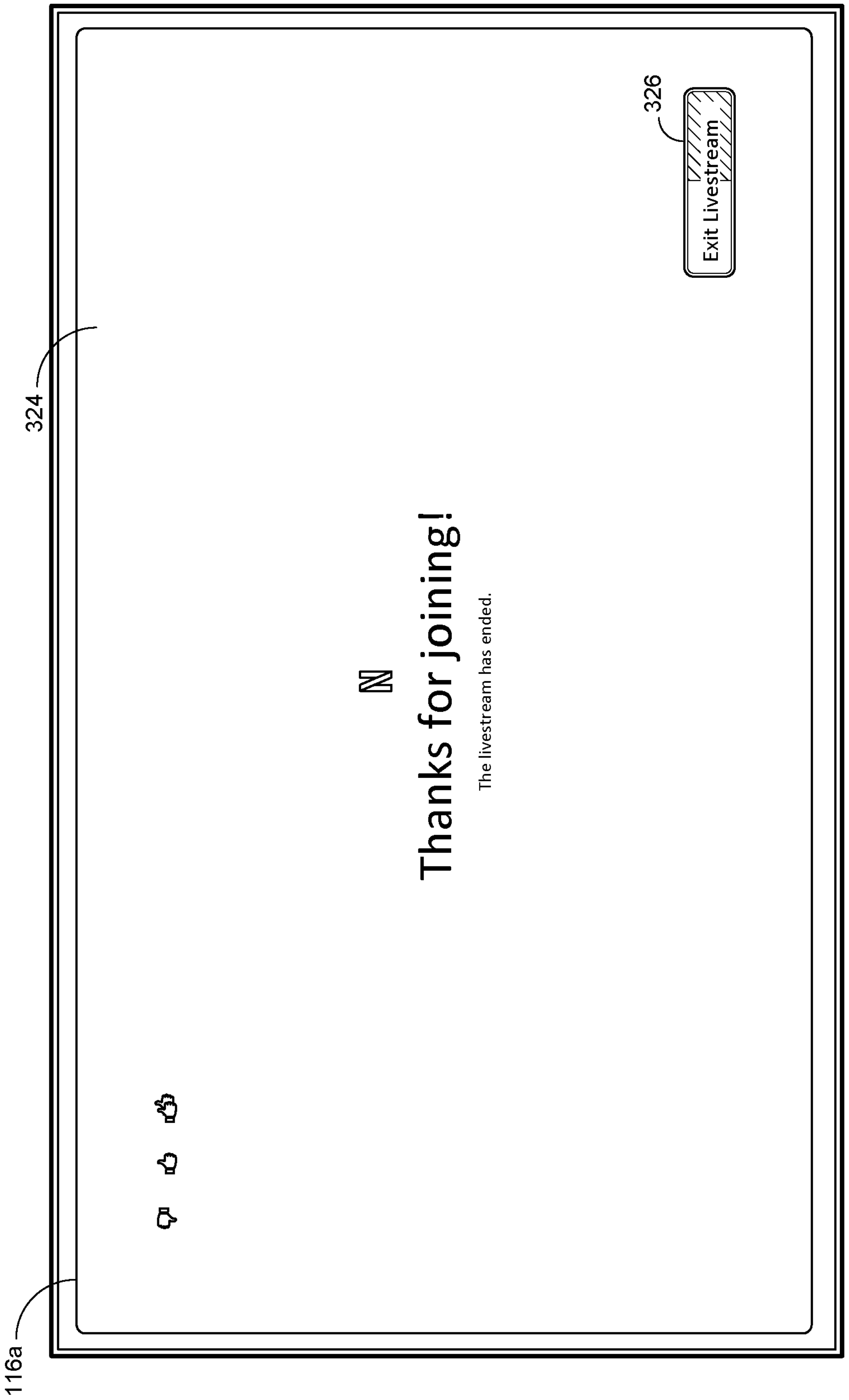
Figure 4:
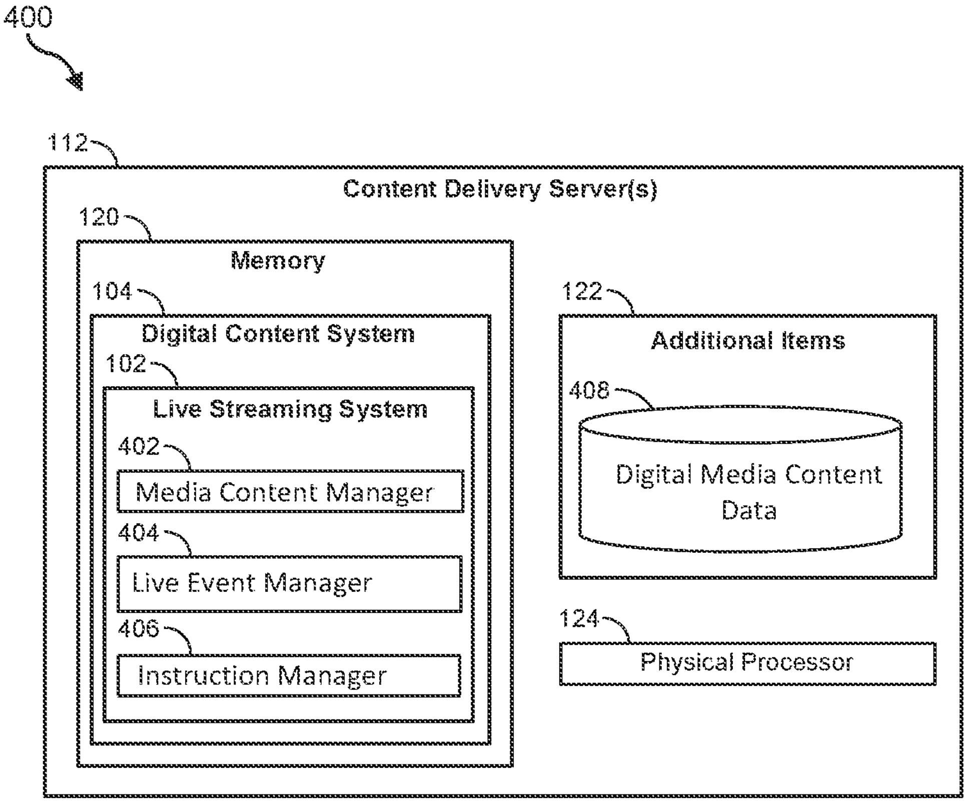
FIG. 4 is a detailed diagram of the live streaming system in accordance with one or more implementations.
Figure 5:
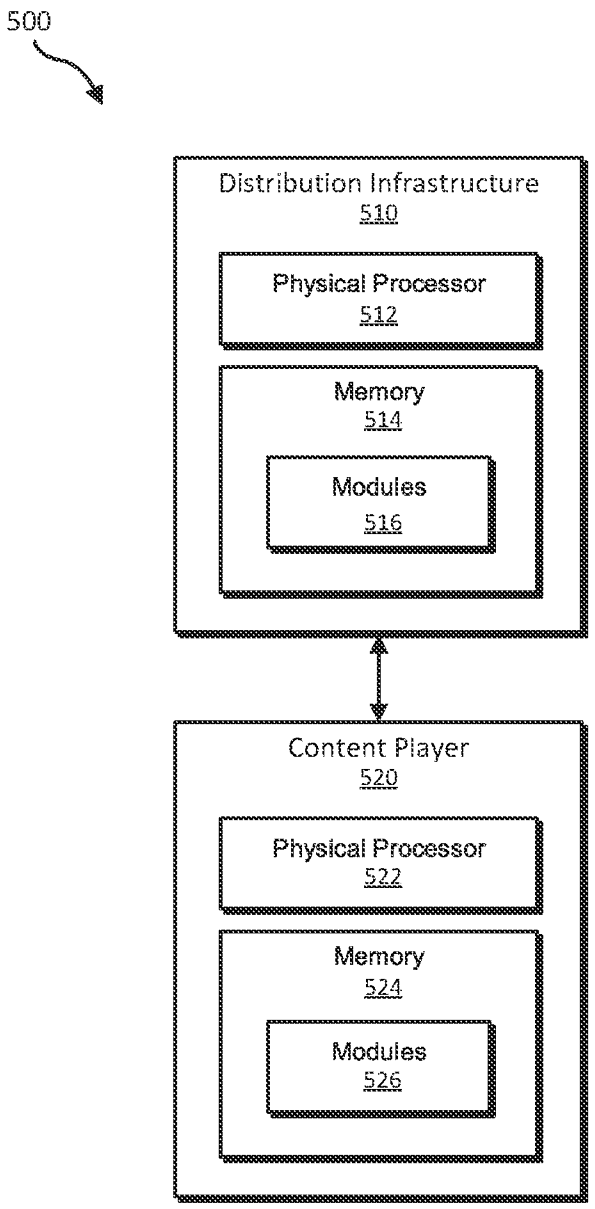
FIG. 5 is a block diagram of an exemplary content distribution ecosystem.
Figure 6:
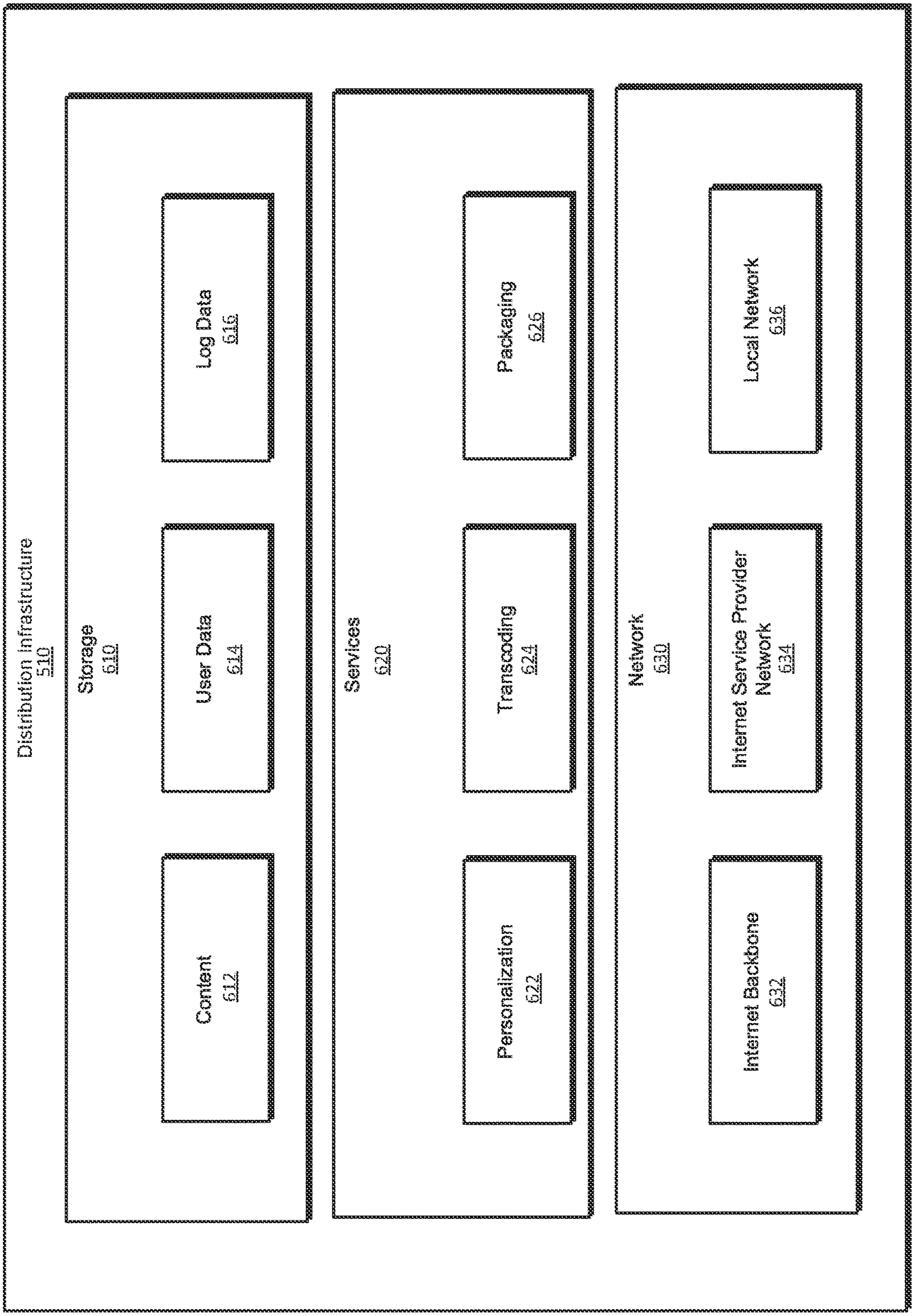
FIG. 6 is a block diagram of an exemplary distribution infrastructure within the content distribution ecosystem shown in FIG. 5.
Figure 7:
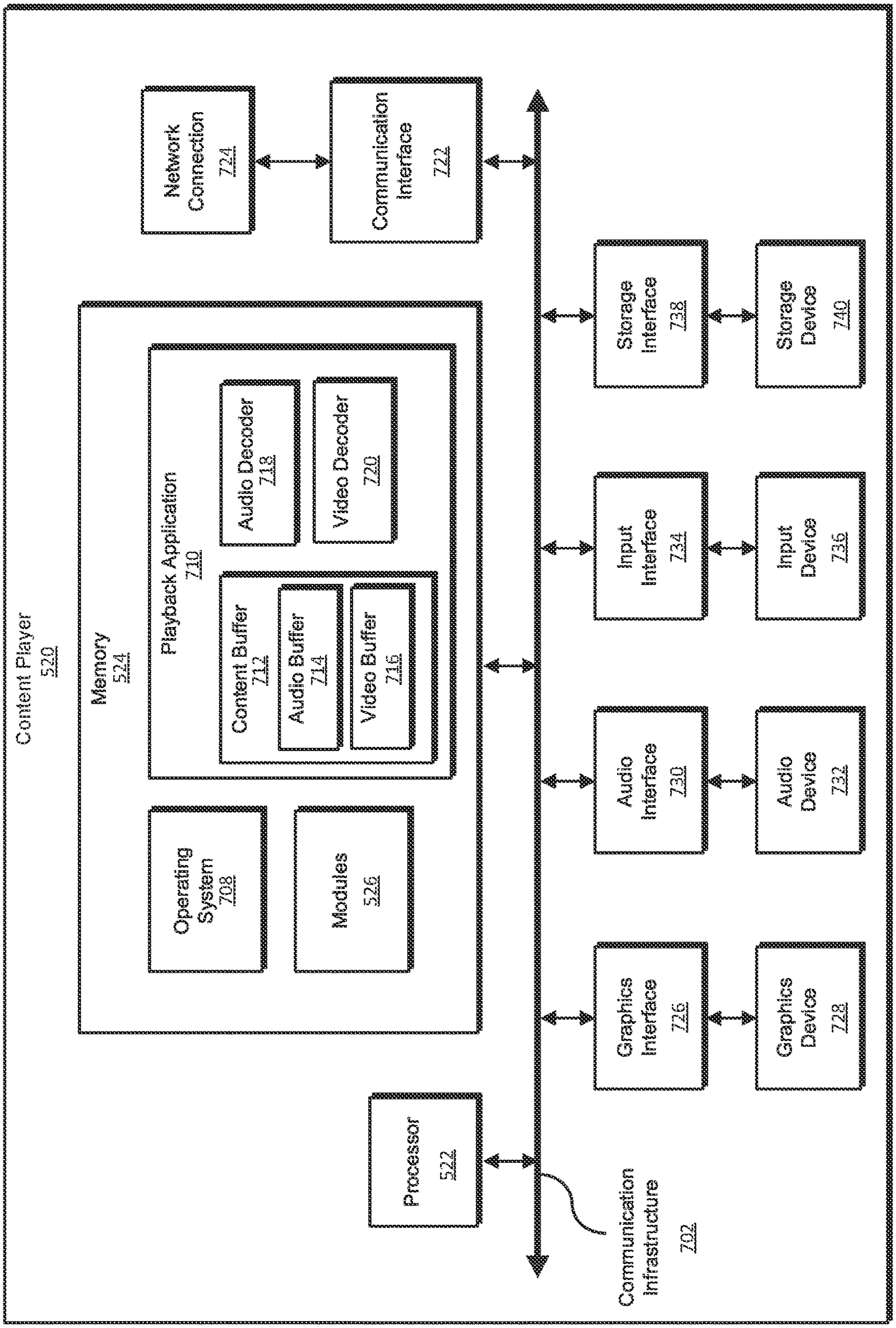
FIG. 7 is a block diagram of an exemplary content player within the content distribution ecosystem shown in FIG. 6.

The following will provide, with reference to FIGS. 1-7, detailed descriptions of a live streaming system that determines when live events have occurred during a live media broadcast and communicates those live events to client media players in a way that triggers the client media players to perform various actions based on the live events. For example, an exemplary network environment is illustrated in FIG. 1 to show the live streaming system operating within a digital content system in connection with client media players on client computing devices. FIG. 2 illustrates steps taken by the live streaming system in triggering client media players to perform various actions based on live events during live media broadcasts. FIGS. 3A and 3B illustrate the live streaming system triggering client media player actions. Finally, FIG. 4 provides additional detail with regard to the features and functionality of the live streaming system. FIGS. 5, 6, and 7 illustrate exemplary ecosystems and infrastructures that can be used in connection with the live streaming system.

As just mentioned, FIG. 1 illustrates an exemplary networking environment 100 implementing aspects of the present disclosure. For example, the networking environment 100 includes content delivery server(s) 112, client computing devices 114*a*-114*n*, and a network 118. As further shown, the client computing devices 114*a*-114*n* include memories 106*a*-106*n*, additional items 108*a*-108*n*, and physical processors 110*a*-110*n*, while the content delivery server(s) 112 includes a memory 120, additional items 122, and a physical processor 124.

In one or more implementations, as shown in FIG. 1, the client computing devices 114*a*-114*n* may be any type of display screen devices such as smartphones, tablets, smart TVs, laptops, smart wearables (e.g., head mounted displays), etc. In at least one implementation, the client computing devices 114*a*-114*n* access the Internet (e.g., wirelessly or non-wirelessly) to receive and transmit data in real-time. Additionally, in one or more implementations, the content delivery server(s) 112 make up a content delivery network including any number of auxiliary services.

As further shown in FIG. 1, a live streaming system 102 may be implemented as part of a digital content system 104 within the memory 120 on the content delivery server(s) 112. In one or more implementations, the digital content system 104 includes a streaming service for providing digital media content to viewers. For example, the digital content system 104 receives and/or generates media data representing pre-recorded media content (e.g., TV shows, movies) and live media content (i.e., content that is being captured and transmitted for playback in real time).

In one or more implementations, the live streaming system 102 operates as a component of the digital content system 104 to facilitate live media broadcasts. For example, the live streaming system 102 receives live media content requests from the client computing devices 114*a*-114*n*, generates media content responses including live media broadcast data, determines that live events associated with a live media broadcast have occurred, generates client media player instructions tailored to the live events that trigger the client media players 114*a*-114*n* to perform various actions and/or modifications, and transmits those instructions via an existing communication channel that carries media content responses along with indications of the one or more determined live events.

As further shown in FIG. 1, the client computing devices 114*a*-114*n* include the client media players 116*a*-116*n*. In one or more implementations, the client computing devices 114*a*-114*n* may include any type of device that is suitable for digital media playback. For example, the client computing devices 114*a*-114*n* may be desktop computers, laptop computers, smart phones, tablets, smart TVs, smart wearables, etc. In some implementations, the client media players 116*a*-116*n* communicate information to and from the digital content system 104 via the network 118. In response to receiving media content responses from the digital content system 104 and/or the live streaming system 102, the client media players 116*a*-116*n* decode and render digital media content (e.g., pre-recorded or live) into audio/visual displays for playback to users of the client computing devices 114*a*-114*n*. In some implementations, the client media players 116*a*-116*n* can further generate audio/visual displays that include timed text such as closed captioning. In at least one implementation, the client media players 116*a*-116*n* perform various actions and/or modify one or more characteristics in response to instructions received from the live streaming system 102 in connection with a live media broadcast.

As mentioned above, the client computing devices 114*a*-114*n* are communicatively coupled with the content delivery server(s) 112 through the network 118. In one or more implementations, the network 118 represents any type or form of communication network, such as the Internet, and may include one or more physical connections, such as a LAN, and/or wireless connections, such as a WAN. In some implementations, the network 118 may represent a telecommunications carrier network. In at least one implementation, the network 118 represents combinations of networks such that the client computing device 114*a* may communicate with the digital content system 104 via a wireless network while the client computing device 114*n* may communicate with the digital content system 104 via a cellular network.

Although FIG. 1 illustrates components of the exemplary networking environment 100 in one arrangement, other arrangements are possible. For example, in one implementation, one or more components of the live streaming system 102 operate as part of a native application that may be installed on the client computing devices 114*a*-114*n*. In another implementation, the live streaming system 102 operates across multiple content delivery servers or content delivery nodes.

In one or more implementations, and as will be explained in greater detail below, the methods and steps performed by the live streaming system 102 reference multiple terms. For example, a "live media broadcast" can refer to media content that is transmitted as soon as it is captured (e.g., in real time). In one or more implementations, a live media broadcast can be combined with pre-recorded content (e.g., a pre-show and/or a post-show). In most implementations, the live streaming system 102 transmits live broadcast media segments to a client media player in response to receiving a content request from that client media player. In additional implementations, the live streaming system 102 transmits a live media broadcast by providing a network address (e.g., a universal resource locator) to a web server that can serve a most-recent portion (e.g., two seconds, three seconds, five seconds) of the live media broadcast.

As used herein, a "media content request" can refer to a request from a client media player on a client computing device for a most-recent portion (e.g., two seconds) of a live media broadcast. For example, a media content request can include one or more identifiers for the client media player, for the client computing device, and/or the user of the client computing device. In one or more implementations, the live streaming system 102 receives media content requests via a dedicated communication channel. In at least one implementation, the digital content system 104 and the client media player establish the dedicated communication channel as part of an initial handshake procedure upon initialization of the client media player on the client computing device. The dedicated communication channel remains established while the client media player is actively playing content (e.g., pre-recorded content or live content) or while the client media player is active or initialized on the client computing device. In some implementations, the dedicated communication channel re-establishes itself during live broadcast playback in the event of technical difficulties with either the network 118 or the content delivery server(s) 112.

As used herein, a "media content response" can refer to a response from the live streaming system 102 that is associated with requested media content. For example, the live streaming system 102 generates a media content response including a network endpoint that can serve the requested media content (e.g., the most-recent two seconds of the live media broadcast). In one or more implementations, the live streaming system 102 transmits a media content response including the media content—and optionally including client media player instructions—via the same dedicated communication channel where the corresponding media content request was transmitted.

As used herein, a "live event" can refer to any portion of a live media broadcast. For example, a live event can include a transition point between pre-recorded content and the live media broadcast, a portion of the live media broadcast where a broadcast error occurs (e.g., a transmission loss, a transmission degradation, a transmission violation, etc.), a portion of the live media broadcast where a broadcast highlight occurs (e.g., a sporting highlight, an interactive feature, a musical highlight, a scene change, a camera angle change, etc.), a conclusion of the live media broadcast, etc.

As used herein, "client media player instructions" can refer to a communication sent to a client media player that causes the client media player to perform one or more actions. For example, the live streaming system 102 generates client media player instructions that cause the client media player to perform one or more actions that are tailored to or in response to a detected live event. The live streaming system 102 generates client media player instructions that cause the client media player to display specific content, modify various characteristics, and/or exit out to a menu of the digital content system 104. In one or more implementations, the live streaming system 102 generates client media player instructions that cause the client media player to display a specific graphic, user interface, control, animation, or other content. Similarly, the live streaming system 102 generates client media player instructions that cause the client media player to modify a seek bar such that portions of the live media broadcast are unseekable or highlighted. As used herein, "unseekable" can refer to portions of a live media broadcast that cannot be found via a client media player seek bar. For example, a portion of a live media broadcast is unseekable if that portion cannot be found or played back in response to a user scrubbing a current playback indicator backwards through the seek bar.

As mentioned above, FIG. 2 is a flow diagram of an exemplary computer-implemented method 200 for triggering actions on a client media player based on live events during a live media broadcast. The steps shown in FIG. 2 may be performed by any suitable computer-executable code and/or computing system, including the system(s) illustrated in FIG. 4. In one example, each of the steps shown in FIG. 2 may represent an algorithm whose structure includes and/or is represented by multiple sub-steps, examples of which will be provided in greater detail below. The steps shown in FIG. 2 may occur in a different order than what is shown. For example, two steps shown in succession may be executed substantially concurrently, or the steps may be executed in the reverse order, etc.

As illustrated in FIG. 2, at step 202 the live streaming system 102 receives, during a live media broadcast, a media content request from a client media player (e.g., the client computing device 114*a*). For example, the live streaming system 102 receives media content requests from the client media player every predetermined number of seconds (e.g., every two seconds) during the live media broadcast. Each media content request can be for media data representing a portion of the live media broadcast.

As further illustrated in FIG. 2, at step 204 the live streaming system 102, in response to determining that a live event has occurred during the live media broadcast, generates one or more client media player instructions tailored to the live event. For example, the live streaming system 102 determines that a live event has occurred by determining that the live media broadcast has begun following pre-show media content, or by determining that the live media broadcast has ended prior to post-show media content. The live streaming system 102 also determines that a live event has occurred by determining that a broadcast error (e.g., a technical difficulty) has occurred during the live media broadcast or by determining that a media highlight has occurred during the live media broadcast. In some implementations, the live streaming system 102 determines that a live event has occurred by determining that a broadcast highlight (e.g., a sporting highlight, a concert highlight) has occurred. Moreover, in at least one implementation, the live streaming system 102 determines that a live event has occurred by determining that the live media broadcast has concluded.

As further illustrated in FIG. 2, at step 206 the live streaming system 102, further in response to determining that a live event associated with the live media broadcast has occurred, generates a media content response including the requested media content and the one or more client media player instructions. For example, the live streaming system 102 generates the media content response including the requested media content and client media player instructions that trigger modifications or actions in the client media player that are specific to the live event. In one or more implementations, client media player modifications or actions include changes to a seek bar of the client media player and/or changes to the functionality of the client media player. If the live streaming system 102 determines that no live event has occurred, the live streaming system 102 generates the media content response with just the requested portion of the live media broadcast. In one or more implementations, the client media player checks every received media content response for instructions tailored to one or more live events that may have occurred in the interval that has elapsed since the last media content request. If no instructions are present, the client media player renders the received media content and generates a new media content request for the next portion of the live media broadcast.

In additional implementations, the live streaming system 102 includes live event information in each media content response that is transmitted to the client media player. In those implementations, for example, the live streaming system 102 sends information in each media content response about all active live events in the live broadcast. In some examples, the live streaming system 102 triggers the client media player in different ways depending on a level of live events that are currently active. To illustrate, one level of live events may trigger the client media player to modify its seek bar, while another level of live events may trigger the client media player to modify one or more behaviors (e.g., the ability to scrub past paid content).

As further illustrated in FIG. 2, at step 208 the live streaming system 102 transmits the media content response to the client media player to trigger the client media player to perform one or more actions based on the one or more client media player instructions. For example, the one or more client media player instructions included in the media content response trigger the client media player to make certain content "unseekable" via the client media player seek bar. In an additional example, the one or more client media player instructions trigger the client media player to direct a viewer back to a main menu of the digital content system 104. In one or more implementations, the live streaming system transmits the media content response including the client media player instruction via a dedicated communication channel between the client media player and the digital content system 104 that was established as part of an initial handshake protocol that occurred when the client media player was initialized.

As discussed above, the live streaming system 102 determines whether a live event has occurred during a live media broadcast and then triggers a client media player to perform one or more actions based on the live event. FIG. 3A illustrates a sequence diagram of acts performed by the client media player 116*a* and the live streaming system 102 during a live media broadcast 302. For example, the live media broadcast 302 may be a comedy special, an awards show, a sporting event, a live music and/or dance performance, a speaking event, and so forth.

In one or more implementations, to facilitate streaming of the live media broadcast 302, the live streaming system 102 and the client media player 116*a* engage in a handshake procedure that establishes a dedicated communication channel between the live streaming system 102 and the client media player 116*a*. In some examples, the handshake occurs prior to the beginning of the live media broadcast 302 (e.g., as with a "waiting room" where client media players sign in to watch the live media broadcast 302 ten minutes before the live media broadcast 302 starting). In additional examples, the handshake occurs when the live media broadcast 302 begins. In yet further examples, the handshake occurs after the live media broadcast 302 has started (e.g., as with a viewer to "tunes in" part way through the live media broadcast 302). With that connection established, the client media player 116*a* generates and transmits a media content request 304 to the live streaming system 102.

In response to receiving the media content request 304, the live streaming system 102 generates a media content response 306. In one or more implementations, the live streaming system 102 generates the media content response 306 including the requested media content (e.g., the most recent two seconds of the live media broadcast 302). In additional implementations, the live streaming system 102 generates the media content response 306 including a network endpoint (e.g., a universal resource locator) of a web server that can provide the requested media content. In response to receiving the media content response 306 from the live streaming system 102, the client media player 116*a* plays the live media content 308 for viewing by a user of the client computing device 114*a*. Moreover, in some implementations, the client media player 116*a* can check each received media content response for the presence of live event instructions. If no instructions are present in the media content response 306, the client media player 116*a* plays the live media content 308, and generates a new media content request for the next portion of the live media broadcast 302.

In at least one implementation, the client media player 116*a* generates and transmits media content requests at predetermined intervals (e.g., every two seconds) via the dedicated communication channel. For example, as further shown in FIG. 3A, the client media player 116*a* generates an additional media content request 310 for an additional portion of the live media broadcast 302. Upon receipt of the additional media content request 310, the live streaming system 102 generates an additional media content response 312. Upon receipt, the client media player 116*a* further plays the live media content 314 indicated by the additional media content response 312. In one or more implementations, the client media player 116*a* continues in a loop of issuing a media content request for the next portion of the live media broadcast 302, and checking for the presence of a live event instruction in the media content response.

As mentioned above, the live streaming system 102 determines that a live event 316 has occurred during the live media broadcast 302. For example, the live streaming system 102 determines that the live media broadcast 302 has begun following pre-show media content. To illustrate, the live streaming system 102 determines that the live media broadcast 302 has begun following pre-recorded media content that is included as a pre-show. Similarly, the live streaming system 102 determines that the live media broadcast 302 has ended prior to post-show media content. As with the pre-show media content, the live streaming system 102 determines that the live media broadcast 302 (e.g., the two second portions of media content delivered in real time) has ended and that a pre-recorded post-show is about to begin playback.

In additional implementations, the live streaming system 102 further determines that a live event has occurred in response to determining that a broadcast error has occurred that is associated with the live media broadcast 302. To illustrate, the live streaming system 102 determines that the source of the live media broadcast has lost connectivity.

Moreover, in some examples, the live streaming system 102 determines a live event has occurred in response to detecting a highlight during the live media broadcast 302. For example, the live streaming system 102 includes one or more machine learning models that detect highlights such as sports goals, scene changes, camera view changes, celebrity or character appearances, an interactive feature (e.g., a voting feature) has been made available, and so forth. In at least one implementation, the live streaming system 102 includes one or more features that enable an authorized user (e.g., a director of the live media broadcast 302) to manually mark that an event has occurred in the live media broadcast 302.

In response to determining that the live event 316 has occurred in association with the live media broadcast 302, the live streaming system 102 generates a media content response 320 that includes client media player instructions tailored to the live event 316. Then, in response to receiving a new media content request 318, the live streaming system 102 generates the media content response 320 including the requested media content and the generated instructions. The client media player 116*a* then checks the media content response 320 for instructions based on the live event 316 and performs actions according to the instructions tailored to the live event 316. The client media player 116*a* also plays the received live media content 322.

In one implementation, the live streaming system 102 generates one or more client media player instructions tailored to the live event 316 by generating instructions that cause the client media player (e.g., the client media player 116*a*) to modify one or more characteristics of a seek bar that is presented within the client media player. To illustrate, the client media player 116*a*—and any other client media player associated with the digital content system 104—includes displayed components such as a video display where digital media content is played and a seek bar that shows a total elapsed playback time of the digital media content as well as the current playback position of the digital media content. Often the client media player 116*a* includes a seek bar that is interactive such that a viewer can scrub the current playback position indicator backwards and forwards to view different portions of the digital media content.

In one or more implementations, the live streaming system 102 generates instructions to modify characteristics of the seek bar that either cause already transmitted portions of the live media broadcast 302 to become "unseekable" or that change portions of the seek bar in a way that draws the viewer's attention to highlights that have occurred during the live media broadcast 302. To illustrate, it may be undesirable for pre-show or post-show content to be available once the live media broadcast 302 has begun or ended. As such, the live streaming system 102 generates instructions that modify the seek bar of the client media player 116*a* (or that cause the client media player 116*a* to modify the seek bar) to effectively remove the pre-show and/or post-show content from the seekable content within the client media player 116*a*.

The instructions modify the seek bar by changing the time of the current playback position to reflect the pre-show begin removed from the seek bar. For example, the live streaming system 102 generates and sends instructions to the client media player 116*a* including the position of the live media broadcast 302. The instructions then cause the client media player 116*a* to modify the seek bar by adjusting the seekable portion of the live media broadcast 302. In another implementation, the live streaming system 102 generates instructions that cause the portion of the seek bar associated with the pre-show to change color and/or become locked such that the viewer cannot scrub the playback position indicator into the portion of the seek bar associated with the pre-show content.

Similarly, the live streaming system 102 makes portions of the live media broadcast 302 where a broadcast error has occurred unseekable. For example, the live streaming system 102 generates instructions that cause the client media player 116*a* to modify the seek bar to effectively remove access to those portions of the live media broadcast 302. To illustrate, the instructions cause the client media player 116*a* to update elapsed playback time and/or the current playback position indicator within the seek bar to reflect a removal of the portion of the live media broadcast 302 where the broadcast error occurred. For example, a broadcast error may be fifteen seconds long following five minutes of normal transmission of the live media broadcast 302. The live streaming system 102 generates and transmits instructions that cause the client media player 116*a* to modify characteristics of the seek bar. For example, the live streaming system 102 generates and sends instructions including the beginning and ending timestamps for the broadcast error. The client media player 116*a* then modifies the seek bar such that, when a viewer scrubs the current playback position indicator backwards within the seek bar, the broadcast error is not shown as the viewer scrubs backwards. Moreover, the live streaming system 102 further modifies the seek bar such that the current playback time following the broadcast error is fifteen seconds shorter than it otherwise would be.

Additionally, in at least one implementation, the live streaming system 102 can generate instructions that alter additional aspects of the client media player. For example, the instructions can cause the client media player to enable the switching between camera views and/or audio tracks only during the live event rather than during the pre or post show. The instructions can cause the client media player to then disable certain camera views or audio tracks if those feeds become unavailable during the live event.

In response to determining that the live event 316 is a broadcast highlight, the live streaming system 102 generates instructions that modify the seek bar of the client media player 116*a* to draw a viewer's attention to the portion of the live media broadcast 302 that include the broadcast highlight. To illustrate, the live streaming system 102 modifies the seek bar such that a portion of the seek bar associated with the broadcast highlight is a different color, a different pattern, includes an animation (e.g., a flashing animation), and/or includes a thumbnail call-out associated with the broadcast highlight.

While the transmissions between the client media player 116*a* and the live streaming system 102 are described above as taking place through a single dedicated communication channel, other arrangements are possible. For example, in one implementation, the live streaming system 102 transmits live event information and instructions via one communication channel while live media content is transmitted via a separate communication channel. In additional implementations, the live streaming system 102 can receive data from and transmit data to the client media player 116*a* via any number of communication channels.

In one or more implementations, the live streaming system 102 generates instructions to perform other actions beyond modifying characteristics of the seek bar. For example, in response to determining that the live event 316 is the conclusion or termination of the live media broadcast 302, the live streaming system 102 generates instructions that cause the client media player 116*a* to close and return the viewer to a main menu of the digital content system 104. As such, the live streaming system 102 generates instructions that effectively move the viewer from one experience within the digital content system 104 (e.g., viewing the live media broadcast 302) to another experience (e.g., browsing available digital media content).

To illustrate, as shown in FIG. 3B and in response to determining that the live event 316 is the conclusion of the live media broadcast 302, the live streaming system 102 generates instructions that cause the client media player 116*a* to display a conclusion interface 324 including a countdown control 326. For example, the instructions cause the client media player 116*a* to structure the countdown control 326 to appear as a countdown timer for a predetermined amount of time. Once that predetermined amount of time has elapsed, the instructions further cause the client media player 116*a* to exit and return the viewer to a main menu of the digital content system 104. In some implementations, the live streaming system 102 generates and transmits instructions that include a time delay. For example, the live streaming system 102 may generate instructions associated with what to do when the predetermined amount of time has elapsed and transmit those instructions along with the instructions that cause the client media player 116*a* to display the conclusion interface 324.

In an additional example, the client media player 116*a* plays the live media broadcast 302 behind the live edge of the live media broadcast 302 by some amount of time (e.g., due to lag, etc.) When the live streaming system 102 determines that a highlight event or broadcast error has occurred, the client media player 116*a* immediately implements received instructions that cause the client media player to modify the display of the seek bar for that portion of the seek bar that is no newer than the current playback time. Similarly, the client media player 116*a* may wait to trigger modifications associated with an "end of live broadcast" event until the client media player 116*a* has caught up to the end of the live media broadcast 302.

When generating instructions including a time delay, the live streaming system 102 implements one or more heuristics or decision techniques to decide which events can be associated with the time delay. Similarly, the live streaming system 102 can generate instructions for actions that should be implemented by the client media player 116*a* only in response to various conditions occurring (e.g., in response to playback proceeding or due to a scrubbing action).

As shown in FIG. 3B, the client media player 116*a* can generate and display the conclusion interface 324 including various characteristics such as the countdown control 326. In additional implementations, the client media player 116*a* generates the user interfaces with other characteristics such as, but not limited to, a seek bar, controls associated with multiple or alternative audio and/or visual streams of a live media broadcast, a title bar (e.g., at the top of the user interface), or a subtitle area (e.g., along the bottom of the user interface).

As mentioned above, and as shown in FIG. 4, the live streaming system 102 performs various functions in response to determining that a live event has occurred during a live media broadcast. FIG. 4 is a block diagram 400 of the live streaming system 102 operating within the memory 106 of the content delivery server(s) 112 while performing these functions. As such, FIG. 4 provides additional detail with regard to these functions. For example, as shown in FIG. 4, the live streaming system 102 can include a media content manager 402, a live event manager 404, and an instruction manager 406. As further shown in FIG. 4, the additional items 122 can store and maintain digital media content data 408.

In certain implementations, the live streaming system 102 may represent one or more software applications, modules, or programs that, when executed by a computing device, may cause the computing device to perform one or more tasks. For example, and as will be described in greater detail below, one or more of the media content manager 402, the live event manager 404, and/or the instruction manager 406 represent software stored and configured to run on one or more computing devices, such as the content delivery server(s) 112. One or more of the media content manager 402, the live event manager 404, and the instruction manager 406 of the live streaming system 102 shown in FIG. 4 may also represent all or portions of one or more special purpose computers to perform one or more tasks.

As mentioned above, and as shown in FIG. 4, the live streaming system 102 includes the media content manager 402. In one or more implementations, the media content manager 402 receives media content requests from content media players during a live media broadcast. For example, in response to receiving a media content request from a content media player, the media content manager 402 generates a media content response including the requested media content. In at least one implementation, the media content manager 402 generates the media content response including the requested media content by generating the media content response with a network endpoint where the requested media content can be downloaded. In some implementations, the media content manager 402 further generates the media content response including instructions generated by the instruction manager 406. As discussed above, the media content manager 402 receives media content requests and transmits media content responses-including client media player instructions-via a dedicated communication channel that exists between the live streaming system 102 and a client media player. In at least one implementation, the media content manager 402 receives media content requests and transmits media content responses via a communication channel that is separate from the dedicated communication channel where live media content is communicated.

As further mentioned above, and as shown in FIG. 4, the live streaming system 102 includes the live event manager 404. In one or more implementations, the live event manager 404 determines that a live event has occurred during a live media broadcast. For example, the live event manager 404 includes pre-programmed instructions in connection with how pre-show or post-show content should be handled. In another implementation, the live event manager 404 includes one or more machine learning models for detecting broadcast errors and/or broadcast highlights. Moreover, the live event manager 404 can include pre-programmed instructions regarding how the conclusion of the live media broadcast should be handled.

As such, the live event manager 404 detects various signals associated with the live media broadcast for use in determining that a live event has occurred. For example, the live event manager 404 detects signals including transmission changes (e.g., such as a change from pre-recorded content to live content) and transmission problems (e.g., such as a transmission drop or static). The live event manager 404 also detects signals during the live media broadcast such as audience signals (e.g., a number of viewers who are currently watching the live media broadcast), interactive features of the live media broadcast (e.g., voting options during the live media broadcast), and so forth.

In most examples, the live event manager 404 utilizes detected signals to determine that media highlights (e.g., sports highlights, celebrity events, interactive features, camera view and scene changes) have occurred in a live media broadcast. In at least one example, the live event manager 404 utilizes the detected signals to determine that paid content (e.g., advertisements) has been inserted in the live media broadcast. For example, the live event manager 404 utilizes computing models, machine learning, pre-programmed rules and heuristics, and other decision mechanisms in determining that a live event has occurred based on the detected signals. In at least one implementation, the live event manager 404 includes one or more mechanisms (e.g., a button or command) that enable a user (e.g., a content creator or owner) to indicate that a live event has occurred in real-time.

As further mentioned above, and as shown in FIG. 4, the live streaming system 102 includes the instruction manager 406. In one or more implementations, the instruction manager 406 generates client media player instructions that are tailored to a determined live event during a live media broadcast. For example, as discussed above, the instruction manager 406 generates client media player instructions that cause the client media player to modify characteristics of a seek bar. Additionally, the instruction manager 406 generates client media player instructions that cause the client media player to display various controls and/or that cause the client media player to close and return the viewer to a menu of the digital content system 104. In additional implementations, the instruction manager 406 generates instructions that cause the client media player to perform other actions such as, but not limited to, reporting data back to the live streaming system 102, requesting additional content from the live streaming system 102, providing a viewer survey associated with the live media broadcast, playing additional content for viewing, and so forth.

As shown in FIGS. 1 and 4, the client computing devices 114*a*-114*n* and the content delivery server(s) 112 include one or more physical processors, such as the physical processors 110*a*-110*n* and 124, respectively. The physical processors 110*a*-110*n* and 124 generally represent any type or form of hardware-implemented processing unit capable of interpreting and/or executing computer-readable instructions. In one implementation, the physical processors 110*a*-110*n* and 124 access and/or modify one or more of the components of the live streaming system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the client computing devices 114*a*-114*n* and the content delivery server(s) 112 include the memories 106*a*-106*n* and 120, respectively. In one or more implementations, the memories 106*a*-106*n* and 120 generally represent any type or form of volatile or non-volatile storage device or medium capable of storing data and/or computer-readable instructions. In one example, the memories 106*a*-106*n* and 120 may store, load, and/or maintain one or more of the components of the live streaming system 102. Examples of the memories 106*a*-106*n* and 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIGS. 1 and 4, the client computing devices 114*a*-114*n* and the content delivery server(s) 112 include the additional items 108*a*-108*n* and 122. In one example, the additional items 122 on the content delivery server(s) 112 include the digital media content data 408. In one or more implementations, the digital media content data 408 includes portions of a live media broadcast that are transmitted in real time. Additionally or alternatively, the digital media content data 408 includes network endpoints (e.g., web servers) that can serve for example two-second portions of the live media broadcast for transmission to client media players.

In summary, the live streaming system 102 provides added efficiency and flexibility in connection with live media broadcasts over conventional streaming platforms. For example, the live streaming system 102 enables modifications and other controls in connection with media content that has already been transmitted during a live media broadcast. While other streaming platforms treat live media broadcasts as recordable media from the client-side, the live streaming system 102 enables additional controls that can make already transmitted media data "unseekable" in connection with a live media broadcast. Similarly, the live streaming system 102 enables highlight indication in connection with already-broadcasted media content during a live media broadcast. As such, the live streaming system 102 allows content creators and owners to have fine-tuned control over how the content of a live media broadcast is experienced and re-experienced by viewers.

The following will provide, with reference to FIG. 5, detailed descriptions of exemplary ecosystems in which content is provisioned to end nodes and in which requests for content are steered to specific end nodes. The discussion corresponding to FIGS. 6 and 7 presents an overview of an exemplary distribution infrastructure and an exemplary content player used during playback sessions, respectively. These exemplary ecosystems and distribution infrastructures are implemented in any of the embodiments described above with reference to FIGS. 1-4.

FIG. 5 is a block diagram of a content distribution ecosystem 500 that includes a distribution infrastructure 510 in communication with a content player 520. In some embodiments, distribution infrastructure 510 is configured to encode data at a specific data rate and to transfer the encoded data to content player 520. Content player 520 is configured to receive the encoded data via distribution infrastructure 510 and to decode the data for playback to a user. The data provided by distribution infrastructure 510 includes, for example, audio, video, text, images, animations, interactive content, haptic data, virtual or augmented reality data, location data, gaming data, or any other type of data that is provided via streaming.

Distribution infrastructure 510 generally represents any services, hardware, software, or other infrastructure components configured to deliver content to end users. For example, distribution infrastructure 510 includes content aggregation systems, media transcoding and packaging services, network components, and/or a variety of other types of hardware and software. In some cases, distribution infrastructure 510 is implemented as a highly complex distribution system, a single media server or device, or anything in between. In some examples, regardless of size or complexity, distribution infrastructure 510 includes at least one physical processor 512 and memory 514. One or more modules 516 are stored or loaded into memory 514 to enable adaptive streaming, as discussed herein.

Content player 520 generally represents any type or form of device or system capable of playing audio and/or video content that has been provided over distribution infrastructure 510. Examples of content player 520 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 510, content player 520 includes a physical processor 522, memory 524, and one or more modules 526. Some or all of the adaptive streaming processes described herein is performed or enabled by modules 526, and in some examples, modules 516 of distribution infrastructure 510 coordinate with modules 526 of content player 520 to provide adaptive streaming of digital content.

In certain embodiments, one or more of modules 516 and/or 526 in FIG. 5 represent one or more software applications or programs that, when executed by a computing device, cause the computing device to perform one or more tasks. For example, and as will be described in greater detail below, one or more of modules 516 and 526 represent modules stored and configured to run on one or more general-purpose computing devices. One or more of modules 516 and 526 in FIG. 5 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 512 and 522 generally represent any type or form of hardware-implemented processing unit capable of interpreting and/or executing computer-readable instructions. In one example, physical processors 512 and 522 access and/or modify one or more of modules 516 and 526, respectively. Additionally or alternatively, physical processors 512 and 522 execute one or more of modules 516 and 526 to facilitate adaptive streaming of digital content. Examples of physical processors 512 and 522 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 514 and 524 generally represent any type or form of volatile or non-volatile storage device or medium capable of storing data and/or computer-readable instructions. In one example, memory 514 and/or 524 stores, loads, and/or maintains one or more of modules 516 and 526. Examples of memory 514 and/or 524 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 6 is a block diagram of exemplary components of distribution infrastructure 510 according to certain embodiments. Distribution infrastructure 510 includes storage 610, services 620, and a network 630. Storage 610 generally represents any device, set of devices, and/or systems capable of storing content for delivery to end users. Storage 610 includes a central repository with devices capable of storing terabytes or petabytes of data and/or includes distributed storage systems (e.g., appliances that mirror or cache content at Internet interconnect locations to provide faster access to the mirrored content within certain regions). Storage 610 is also configured in any other suitable manner.

As shown, storage 610 may store a variety of different items including content 612, user data 614, and/or log data 616. Content 612 includes television shows, movies, video games, user-generated content, and/or any other suitable type or form of content. User data 614 includes personally identifiable information (PII), payment information, preference settings, language and accessibility settings, and/or any other information associated with a particular user or content player. Log data 616 includes viewing history information, network throughput information, and/or any other metrics associated with a user's connection to or interactions with distribution infrastructure 510.

Services 620 includes personalization services 622, transcoding services 624, and/or packaging services 626. Personalization services 622 personalize recommendations, content streams, and/or other aspects of a user's experience with distribution infrastructure 510. Transcoding services 624 compress media at different bitrates which, as described in greater detail below, enable real-time switching between different encodings. Packaging services 626 package encoded video before deploying it to a delivery network, such as network 630, for streaming.

Network 630 generally represents any medium or architecture capable of facilitating communication or data transfer. Network 630 facilitates communication or data transfer using wireless and/or wired connections. Examples of network 630 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 6, network 630 includes an Internet backbone 632, an internet service provider network 634, and/or a local network 636. As discussed in greater detail below, bandwidth limitations and bottlenecks within one or more of these network segments triggers video and/or audio bit rate adjustments.

FIG. 7 is a block diagram of an exemplary implementation of content player 520 of FIG. 5. Content player 520 generally represents any type or form of computing device capable of reading computer-executable instructions. Content player 520 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 7, in addition to processor 522 and memory 524, content player 520 includes a communication infrastructure 702 and a communication interface 722 coupled to a network connection 724. Content player 520 also includes a graphics interface 726 coupled to a graphics device 728, an audio interface 730 coupled to an audio device 732, an input interface 734 coupled to an input device 736, and a storage interface 738 coupled to a storage device 740.

Communication infrastructure 702 generally represents any type or form of infrastructure capable of facilitating communication between one or more components of a computing device. Examples of communication infrastructure 702 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 524 generally represents any type or form of volatile or non-volatile storage device or medium capable of storing data and/or other computer-readable instructions. In some examples, memory 524 stores and/or loads an operating system 708 for execution by processor 522. In one example, operating system 708 includes and/or represents software that manages computer hardware and software resources and/or provides common services to computer programs and/or applications on content player 520.

Operating system 708 performs various system management functions, such as managing hardware components (e.g., graphics interface 726, audio interface 730, input interface 734, and/or storage interface 738). Operating system 708 also provides process and memory management models for playback application 710. The modules of playback application 710 includes, for example, a content buffer 712, an audio decoder 718, and a video decoder 720.

Playback application 710 is configured to retrieve digital content via communication interface 722 and play the digital content through graphics interface 726 and audio interface

730. Graphics interface 726 is configured to transmit a rendered video signal to graphics device 728. Audio interface 730 is configured to transmit a rendered audio signal to audio device 732. In normal operation, playback application 710 receives a request from a user to play a specific title or specific content. Playback application 710 then identifies one or more encoded video and audio streams associated with the requested title.

In one embodiment, playback application 710 begins downloading the content associated with the requested title by downloading sequence data encoded to the lowest audio and/or video playback bitrates to minimize startup time for playback. The requested digital content file is then downloaded into content buffer 712, which is configured to serve as a first-in, first-out queue. In one embodiment, each unit of downloaded data includes a unit of video data or a unit of audio data. As units of video data associated with the requested digital content file are downloaded to the content player 520, the units of video data are pushed into the content buffer 712. Similarly, as units of audio data associated with the requested digital content file are downloaded to the content player 520, the units of audio data are pushed into the content buffer 712. In one embodiment, the units of video data are stored in video buffer 716 within content buffer 712 and the units of audio data are stored in audio buffer 714 of content buffer 712.

A video decoder 720 reads units of video data from video buffer 716 and outputs the units of video data in a sequence of video frames corresponding in duration to the fixed span of playback time. Reading a unit of video data from video buffer 716 effectively de-queues the unit of video data from video buffer 716. The sequence of video frames is then rendered by graphics interface 726 and transmitted to graphics device 728 to be displayed to a user.

An audio decoder 718 reads units of audio data from audio buffer 714 and outputs the units of audio data as a sequence of audio samples, generally synchronized in time with a sequence of decoded video frames. In one embodiment, the sequence of audio samples is transmitted to audio interface 730, which converts the sequence of audio samples into an electrical audio signal. The electrical audio signal is then transmitted to a speaker of audio device 732, which, in response, generates an acoustic output.

In situations where the bandwidth of distribution infrastructure 510 is limited and/or variable, playback application 710 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 726 is configured to generate frames of video data and transmit the frames of video data to graphics device 728. In one embodiment, graphics interface 726 is included as part of an integrated circuit, along with processor 522. Alternatively, graphics interface 726 is configured as a hardware accelerator that is distinct from (i.e., is not integrated within) a chipset that includes processor 522.

Graphics interface 726 generally represents any type or form of device configured to forward images for display on graphics device 728. For example, graphics device 728 is fabricated using liquid crystal display (LCD) technology, cathode-ray technology, and light-emitting diode (LED) display technology (either organic or inorganic). In some embodiments, graphics device 728 also includes a virtual reality display and/or an augmented reality display. Graphics device 728 includes any technically feasible means for generating an image for display. In other words, graphics device 728 generally represents any type or form of device capable of visually displaying information forwarded by graphics interface 726.

As illustrated in FIG. 7, content player 520 also includes at least one input device 736 coupled to communication infrastructure 702 via input interface 734. Input device 736 generally represents any type or form of computing device capable of providing input, either computer or human generated, to content player 520. Examples of input device 736 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 520 also includes a storage device 740 coupled to communication infrastructure 702 via a storage interface 738. Storage device 740 generally represents any type or form of storage device or medium capable of storing data and/or other computer-readable instructions. For example, storage device 740 is a magnetic disk drive, a solid-state drive, an optical disk drive, a flash drive, or the like. Storage interface 738 generally represents any type or form of interface or device for transferring data between storage device 740 and other components of content player 520.

EXAMPLE EMBODIMENTS

Example 1: A computer-implemented method for triggering actions by a client media player based on live events that occur during live media broadcasts. For example, the method may include receiving, at a content delivery server during a live media broadcast, a media content request from a client media player, in response to determining that a live event has occurred during the live media broadcast, generating one or more client media player instructions tailored to the live event, and generating a media content response including the requested media content and the one or more client media player instructions, and transmitting the media content response to the client media player to trigger the client media player to perform one or more actions based on the one or more client media player instructions.

Example 2: The computer-implemented method of Example 1, wherein the content delivery server receives media content requests every predetermined number of seconds during the live media broadcast.

Example 3: The computer-implemented method of any of Examples 1 and 2, wherein determining that the live event associated with the live media broadcast has occurred includes at least one of determining that the live media broadcast has begun following pre-show media content, determining that the live media broadcast has ended prior to post-show media content, determining that a broadcast error has occurred associated with the live media broadcast, determining that a media highlight has occurred during the live media broadcast, or determining that paid content has been inserted into the live media broadcast.

Example 4: The computer-implemented method of any of Examples 1-3, wherein determining that the media highlight has occurred during the live media broadcast includes at least one of determining that a sports highlight has occurred during the live media broadcast, determining that a celebrity event has occurred during the live media broadcast, determining that an availability of an interactive feature has changed during the live media broadcast, determining that a camera view has changed during the live media broadcast, or determining that a scene change has occurred during the live media broadcast.

Example 5: The computer-implemented method of any of Examples 1-4, wherein generating the one or more client media player instructions tailored to the live event includes generating one or more client media player instructions to modify one or more characteristics of a user interface presented by the client media player in association with the live media broadcast.

Example 6: The computer-implemented method of any of Examples 1-5, wherein the one or more characteristics of the user interface presented by the client media player include one or more of a seek bar, a control associated with playback of one or more streams of the live media broadcast, a title bar, or a subtitle area.

Example 7: The computer-implemented method of any of Examples 1-6, wherein generating the one or more client media player instructions to modify one or more characteristics of a seek bar presented by the client media player in association with the live media broadcast includes at least one of generating client media player instructions to modify one or more characteristics of the seek bar to make the pre-show media content unseekable, generating client media player instructions to modify one or more characteristics of the seek bar to make the post-show media content unseekable, generating client media player instructions to modify one or more characteristics of the seek bar to make a portion of the live media broadcast associated with the broadcast error unseekable, or generating client media player instructions to modify one or more characteristics of the seek bar to indicate where the media highlight has occurred within a portion of the live media broadcast that has already been transmitted.

Example 8: The computer-implemented method of any of Examples 1-7, wherein determining that the live event associated with the live media broadcast has occurred includes determining that the live media broadcast has concluded and generating the one or more client media player instructions tailored to the live event includes generating client media player instructions that cause the client media player to close and return a user of the client media player to a digital content system main menu.

In some examples, a system may include at least one processor and a physical memory including computer-executable instructions that, when executed by the at least one processor, cause the at least one processor to perform various acts. For example, the computer-executable instructions may cause the at least one processor to perform acts including receiving, during a live media broadcast, a media content request from a client media player, in response to determining that a live event associated with the live media broadcast has occurred, generating one or more client media player instructions tailored to the live event, and generating a media content response including the requested media content and the one or more client media player instructions, and transmitting the media content response to the client media player to trigger the client media player to perform one or more actions based on the one or more client media player instructions.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to receive, during a live media broadcast, a media content request from a client media player, in response to determining that a live event associated with the live media broadcast has occurred, generate one or more client media player instructions tailored to the live event, and generate a media content response including the requested media content and the one or more client media player instructions, and transmit the media content response to the client media player to trigger the client media player to perform one or more actions based on the one or more client media player instructions.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:

receiving, at a content delivery server during a live media broadcast, a media content request from a client media player;

in response to determining that a live event has occurred during the live media broadcast:

generating one or more client media player instructions tailored to the live event, wherein the one or more client media player instructions cause the client media player to modify a seek bar such that one or more portions of the live media broadcast are unseekable for playback during at least a duration of the live media broadcast and wherein the one or more client media player instructions include at least one beginning timestamp and at least one ending timestamp of the one or more portions of the live media broadcast based on a broadcast error; and generating a media content response comprising the requested media content and the one or more client media player instructions; and transmitting the media content response to the client media player to trigger the client media player to perform one or more actions based on the one or more client media player instructions, wherein the one or more client media player instructions cause the client media player to update a playback time within the seek bar to reflect a removal of the broadcast error, by removing a length of the broadcast error from the playback time, based on the at least one beginning timestamp and the at least one ending timestamp.

2. The computer-implemented method of claim 1, wherein the content delivery server receives media content requests every predetermined number of seconds during the live media broadcast.

3. The computer-implemented method of claim 1, wherein determining that the live event has occurred during the live media broadcast comprises at least one of:

determining that the live media broadcast has begun following pre-show media content;

determining that the live media broadcast has ended prior to post-show media content;

determining that the broadcast error has occurred associated with the live media broadcast;

determining that a media highlight has occurred during the live media broadcast; or determining that paid content has been inserted into the live media broadcast.

4. The computer-implemented method of claim 3, wherein determining that the media highlight has occurred during the live media broadcast comprises at least one of:

determining that a sports highlight has occurred during the live media broadcast;

determining that a celebrity event has occurred during the live media broadcast;

determining that an availability of an interactive feature has changed during the live media broadcast;

determining that a camera view has changed during the live media broadcast; or determining that a scene change has occurred during the live media broadcast.

5. The computer-implemented method of claim 3, wherein generating the one or more client media player instructions tailored to the live event comprises generating one or more client media player instructions to modify one or more characteristics of a user interface presented by the client media player in association with the live media broadcast.

6. The computer-implemented method of claim 5, wherein the one or more characteristics of the user interface presented by the client media player comprise one or more of the seek bar, a control associated with playback of one or more streams of the live media broadcast, a title bar, or a subtitle area.

7. The computer-implemented method of claim 5, wherein generating the one or more client media player instructions to modify one or more characteristics of the user interface presented by the client media player in association with the live media broadcast comprises at least one of:

generating client media player instructions to modify one or more characteristics of the seek bar to make the pre-show media content unseekable;

generating client media player instructions to modify one or more characteristics of the seek bar to make the post-show media content unseekable;

generating client media player instructions to modify one or more characteristics of the seek bar to make a portion of the live media broadcast associated with the broadcast error unseekable; or generating client media player instructions to modify one or more characteristics of the seek bar to indicate where the media highlight has occurred within a portion of the live media broadcast that has already been transmitted.

8. The computer-implemented method of claim 1, wherein:

determining that the live event has occurred during the live media broadcast comprises determining that the live media broadcast has concluded; and generating the one or more client media player instructions tailored to the live event comprises generating client media player instructions that cause the client media player to close and return a user of the client media player to a digital content system main menu.

9. A system comprising:

at least one physical processor; and physical memory comprising computer-executable instructions that, when executed by the at least one physical processor, cause the at least one physical processor to perform acts comprising:

receiving, during a live media broadcast, a media content request from a client media player;

in response to determining that a live event has occurred during the live media broadcast:

generating one or more client media player instructions tailored to the live event, wherein the one or more client media player instructions cause the client media player to modify a seek bar such that one or more portions of the live media broadcast are unseekable for playback during at least a duration of the live media broadcast and wherein the one or more client media player instructions include at least one beginning timestamp and at least one ending timestamp of the one or more portions of the live media broadcast based on a broadcast error; and generating a media content response comprising the requested media content and the one or more client media player instructions; and transmitting the media content response to the client media player to trigger the client media player to perform one or more actions based on the one or more client media player instructions, wherein the one or more client media player instructions cause the client media player to update a playback time within the seek bar to reflect a removal of the broadcast error, by removing a length of the broadcast error from the playback time, based on the at least one beginning timestamp and the at least one ending timestamp.

10. The system of claim 9, wherein additional media content requests are received every predetermined number of seconds during the live media broadcast.

11. The system of claim 9, wherein determining that the live event has occurred during the live media broadcast comprises at least one of:

determining that the live media broadcast has begun following pre-show media content;

determining that the live media broadcast has ended prior to post-show media content;

determining that the broadcast error has occurred associated with the live media broadcast;

determining that a media highlight has occurred during the live media broadcast; or determining that paid content has been inserted into the live media broadcast.

12. The system of claim 11, wherein determining that the media highlight has occurred during the live media broadcast comprises at least one of:

determining that a sports highlight has occurred during the live media broadcast;

determining that a celebrity event has occurred during the live media broadcast;

determining that an availability of an interactive feature has changed during the live media broadcast;

determining that a camera view has changed during the live media broadcast; or determining that a scene change has occurred during the live media broadcast.

13. The system of claim 11, wherein generating the one or more client media player instructions tailored to the live event comprises generating one or more client media player instructions to modify one or more characteristics of a user interface presented by the client media player in association with the live media broadcast.

14. The system of claim 13, wherein generating the one or more client media player instructions to modify one or more characteristics of the user interface presented by the client media player in association with the live media broadcast comprises at least one of:

generating client media player instructions to modify one or more characteristics of the seek bar to make the pre-show media content unseekable;

generating client media player instructions to modify one or more characteristics of the seek bar to make the post-show media content unseekable;

generating client media player instructions to modify one or more characteristics of the seek bar to make a portion of the live media broadcast associated with the broadcast error unseekable; or generating client media player instructions to modify one or more characteristics of the seek bar to indicate where the media highlight has occurred within a portion of the live media broadcast that has already been transmitted.

15. The system of claim 9, wherein:

determining that the live event has occurred during the live media broadcast comprises determining that the live media broadcast has concluded; and generating the one or more client media player instructions tailored to the live event comprises generating client media player instructions that cause the client media player to close and return a user of the client media player to a digital content system main menu.

16. A non-transitory computer-readable medium comprising one or more computer-executable instructions that, when executed by at least one processor of a computing device, cause the computing device to:

receive, during a live media broadcast, a media content request from a client media player;

in response to determining that a live event has occurred during the live media broadcast:

generate one or more client media player instructions tailored to the live event, wherein the one or more client media player instructions cause the client media player to modify a seek bar such that one or more portions of the live media broadcast are unseekable for playback during at least a duration of the live media broadcast and wherein the one or more client media player instructions include at least one beginning timestamp and at least one ending timestamp of the one or more portions of the live media broadcast based on a broadcast error; and generate a media content response comprising the requested media content and the one or more client media player instructions; and transmit the media content response to the client media player to trigger the client media player to perform one or more actions based on the one or more client media player instructions, wherein the one or more client media player instructions cause the client media player to update a playback time within the seek bar to reflect a removal of the broadcast error, by removing a length of the broadcast error from the playback time, based on the at least one beginning timestamp and the at least one ending timestamp.

17. The non-transitory computer-readable medium of claim 16, wherein additional media content requests are received every predetermined number of seconds during the live media broadcast.

18. The non-transitory computer-readable medium of claim 16, wherein determining that the live event has occurred during the live media broadcast comprises at least one of:

determining that the live media broadcast has begun following pre-show media content;

determining that the live media broadcast has ended prior to post-show media content;

determining that the broadcast error has occurred associated with the live media broadcast;

determining that a media highlight has occurred during the live media broadcast; or determining that paid content has been inserted into the live media broadcast.

19. The non-transitory computer-readable medium of claim 18, wherein determining that the media highlight has occurred during the live media broadcast comprises at least one of:

determining that a sports highlight has occurred during the live media broadcast;

determining that a celebrity event has occurred during the live media broadcast;

determining that an availability of an interactive feature has changed during the live media broadcast;

determining that a camera view has changed during the live media broadcast; or determining that a scene change has occurred during the live media broadcast.

20. The non-transitory computer-readable medium of claim 18, wherein generating the one or more client media player instructions to modify one or more characteristics of the seek bar presented by the client media player in association with the live media broadcast comprises at least one of:

generating client media player instructions to modify one or more characteristics of the seek bar to make the pre-show media content unseekable;

generating client media player instructions to modify one or more characteristics of the seek bar to make the post-show media content unseekable;

generating client media player instructions to modify one or more characteristics of the seek bar to make a portion of the live media broadcast associated with the broadcast error unseekable; or generating client media player instructions to modify one or more characteristics of the seek bar to indicate where the media highlight has occurred within a portion of the live media broadcast that has already been transmitted.

* * * * *